(12) United States Patent
Rogge et al.

(10) Patent No.: US 12,344,110 B2
(45) Date of Patent: Jul. 1, 2025

(54) MODULAR SUPPORT SYSTEM FOR ELECTRIC VEHICLE CHARGERS

(71) Applicant: Black & Veatch Holding Company, Overland Park, KS (US)

(72) Inventors: Chris Stewart Rogge, Overland Park, KS (US); Mark Anthony Shreve, Cary, NC (US); Timothy Cory Blatter, Denver, CO (US)

(73) Assignee: BLACK & VEATCH CORPORATION, Overland Park, KS (US)

( * ) Notice: Subject to any disclaimer, the term of this patent is extended or adjusted under 35 U.S.C. 154(b) by 0 days.

(21) Appl. No.: 18/663,321

(22) Filed: May 14, 2024

(65) Prior Publication Data

US 2024/0416774 A1     Dec. 19, 2024

Related U.S. Application Data

(60) Provisional application No. 63/508,030, filed on Jun. 14, 2023.

(51) Int. Cl.
*B60L 53/31*     (2019.01)
*E04H 1/12*     (2006.01)

(52) U.S. Cl.
CPC ............ *B60L 53/31* (2019.02); *E04H 1/1233* (2013.01)

(58) Field of Classification Search
CPC ....... B60L 53/31; B65D 19/38; B65D 19/385; B65D 19/44; B65D 2519/00547; B65D 2519/0098
See application file for complete search history.

(56) References Cited

U.S. PATENT DOCUMENTS

| | | | |
|---|---|---|---|
| 3,136,472 A * | 6/1964 | Waller | B65D 9/12 229/199.1 |
| 5,847,537 A | 12/1998 | Parmley, Sr. | |
| 10,828,770 B2 | 11/2020 | Zhao et al. | |

(Continued)

FOREIGN PATENT DOCUMENTS

| CN | 102545301 A | 7/2012 |
|---|---|---|
| EP | 2426007 A2 | 3/2012 |

(Continued)

OTHER PUBLICATIONS

International Search Report and Written Opinion in related PCT Application PCT/US2024/029704 mailed Sep. 5, 2024, 9 pages.

*Primary Examiner* — Daniel J Rohrhoff
(74) *Attorney, Agent, or Firm* — HOVEY WILLIAMS LLP

(57) ABSTRACT

A modular support system that may be quickly and easily installed in a parking lot or other area for supporting and installing one or more electric vehicle chargers. The modular support system includes a number of identical support skids that may be stacked and transported to an installation site and then quickly and easily installed at the site in any number and pattern to support any number of EV chargers in nearly any arrangement. The modular support system also includes quick connect mechanisms for interconnecting the skids to one another; protective bollards for partially surrounding and protecting an electric vehicle charger placed on the skids; and quick connect mechanisms for supporting the protective bollard frame to one of the skids.

18 Claims, 11 Drawing Sheets

(56) References Cited

U.S. PATENT DOCUMENTS

| | | | |
|---|---|---|---|
| 11,479,135 B2* | 10/2022 | Price | B60L 53/305 |
| 2010/0175596 A1* | 7/2010 | Scheetz | B65D 19/385 |
| | | | 108/55.1 |
| 2011/0048990 A1* | 3/2011 | Goda | B65D 81/053 |
| | | | 206/521 |
| 2011/0284711 A1* | 11/2011 | Hsiao | H05K 7/1485 |
| | | | 248/346.03 |
| 2017/0129356 A1* | 5/2017 | Johnson | B60L 53/63 |
| 2020/0062450 A1* | 2/2020 | Rølund | B65G 1/04 |
| 2020/0399014 A1* | 12/2020 | Shuert | B65D 19/38 |
| 2021/0245614 A1* | 8/2021 | Flynn | B60L 53/30 |
| 2021/0273466 A1 | 9/2021 | Robinson et al. | |
| 2021/0394628 A1 | 12/2021 | Gomez Puerto et al. | |
| 2022/0227529 A1* | 7/2022 | Jang | B65D 19/06 |
| 2022/0274495 A1 | 9/2022 | Soroky et al. | |
| 2023/0032979 A1 | 2/2023 | Neligan et al. | |
| 2023/0182955 A1* | 6/2023 | Park | B65D 19/12 |
| | | | 206/600 |
| 2024/0075834 A1* | 3/2024 | Michael | B60L 53/18 |
| 2024/0174102 A1* | 5/2024 | Molchanov | B67D 7/42 |

FOREIGN PATENT DOCUMENTS

| | | |
|---|---|---|
| EP | 3922579 A1 | 12/2021 |
| JP | 7109152 B2 | 7/2022 |
| KR | 10-2019-0047205 A | 5/2019 |
| WO | 2020-153851 | 7/2020 |
| WO | 2022241160 | 5/2022 |
| WO | 2022226040 | 10/2022 |
| WO | 2022-235619 | 11/2022 |

* cited by examiner

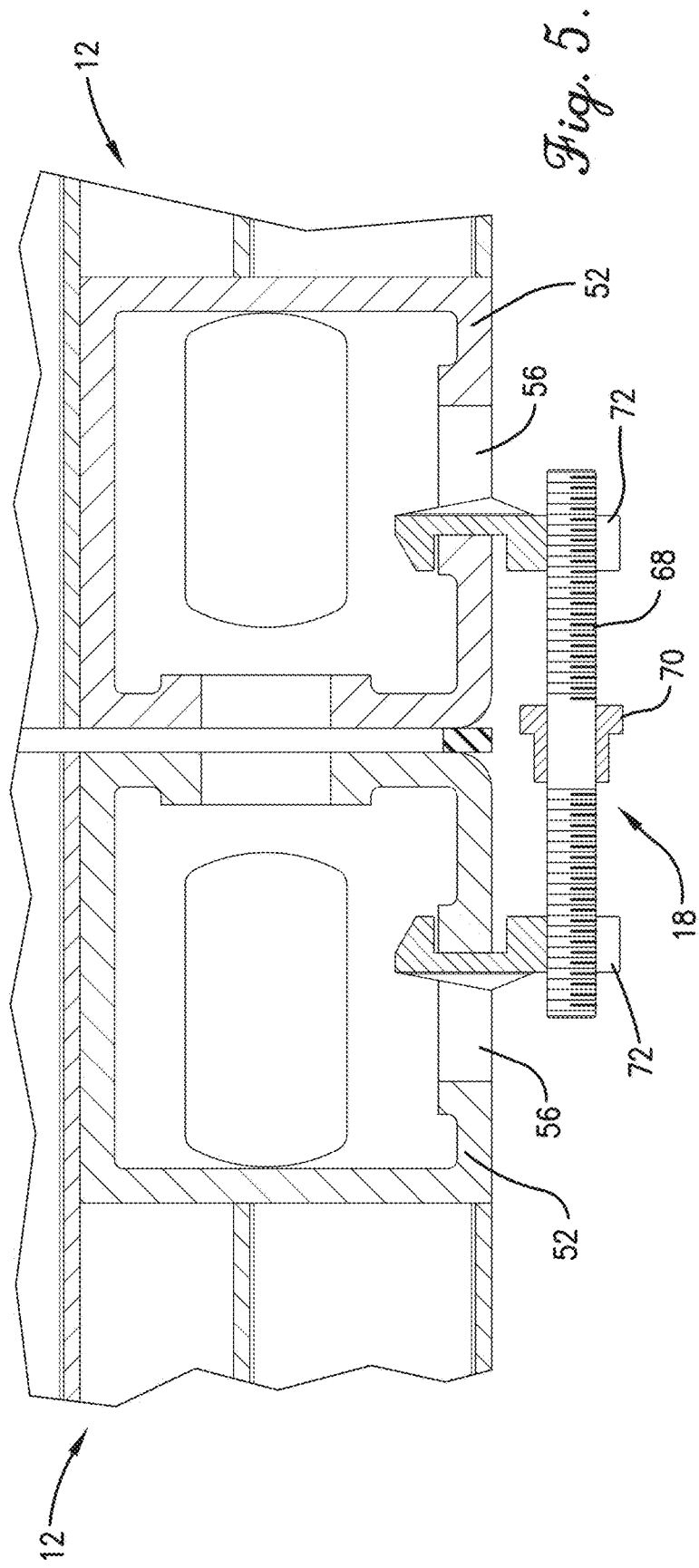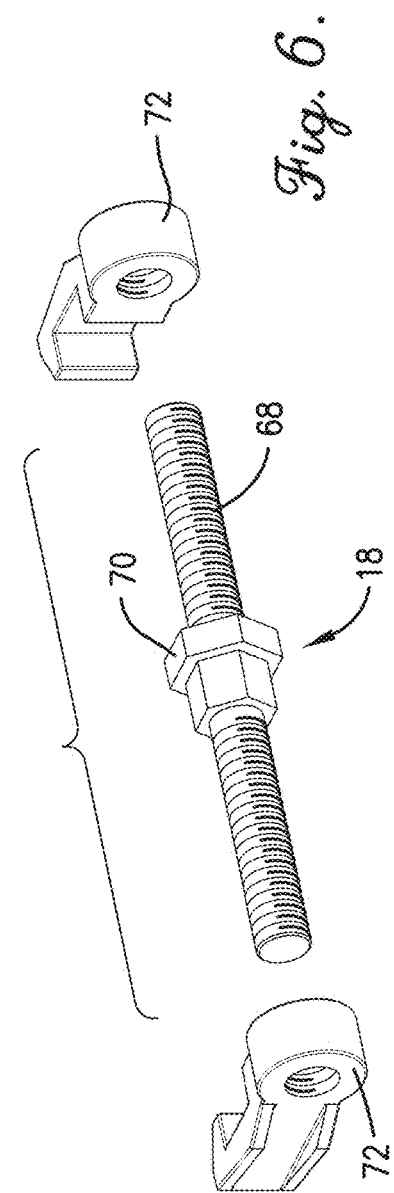

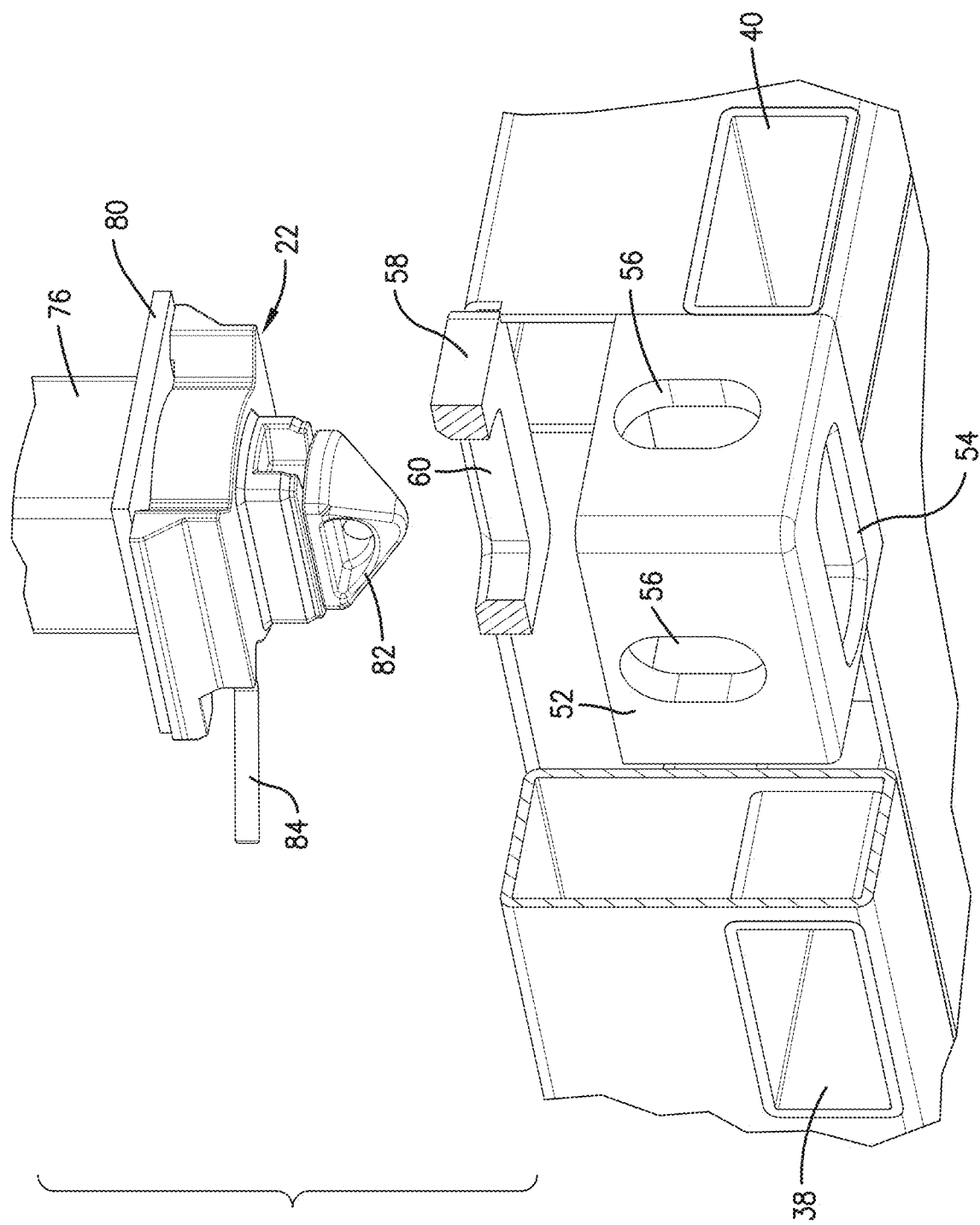

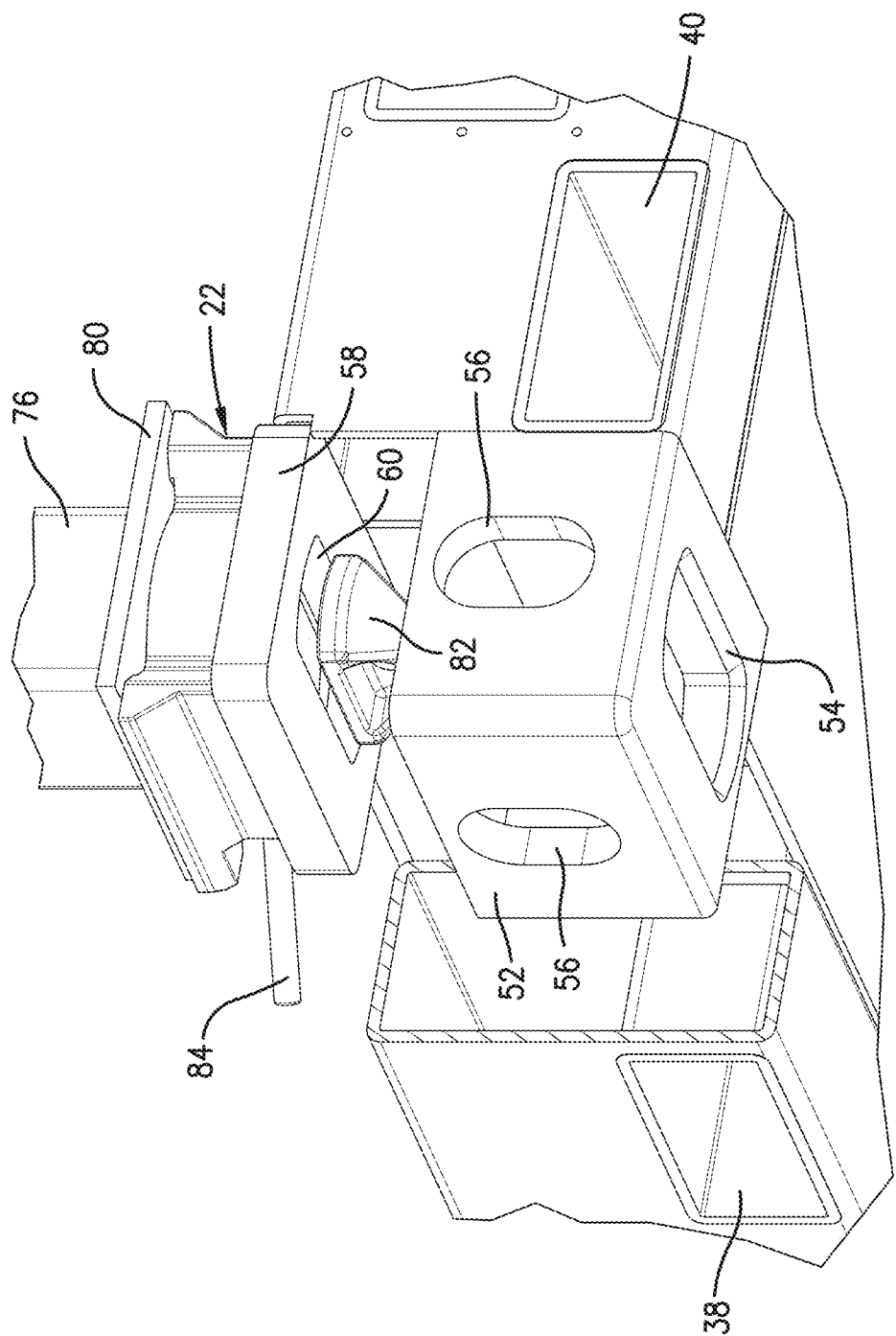

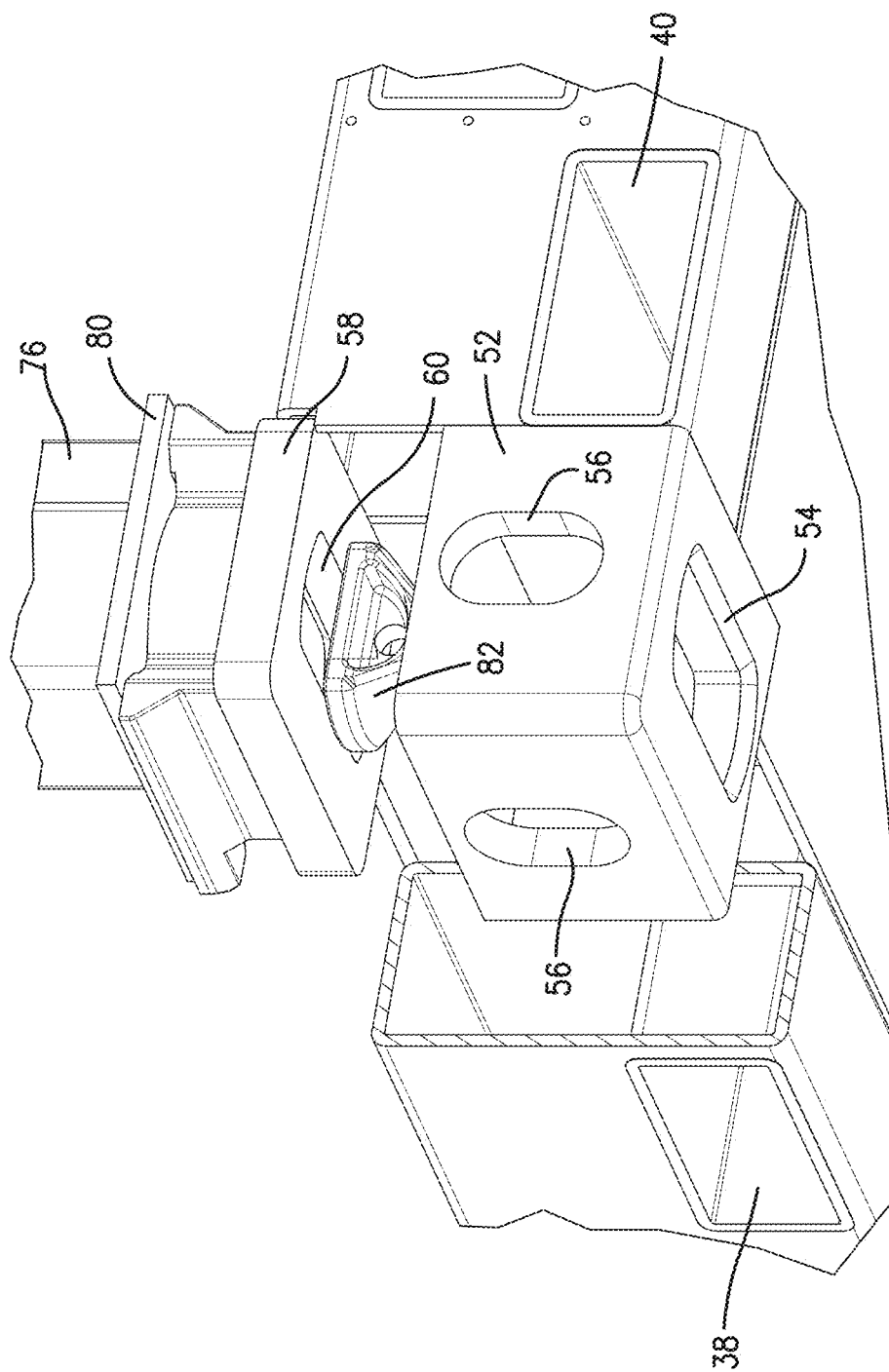

MODULAR SUPPORT SYSTEM FOR ELECTRIC VEHICLE CHARGERS

RELATED APPLICATIONS

The present patent application is a non-provisional utility patent application which claims priority benefit, with regard to all common subject matter, of earlier-filed U.S. Provisional Application Ser. No. 63/508,030; titled "MODULAR ELECTRIC VEHICLE CHARGING SYSTEM" and filed Jun. 14, 2023. The Provisional Application is hereby incorporated by reference, in its entirety, into the current patent application.

BACKGROUND OF THE INVENTION

The widespread adoption of electric vehicles is currently hampered by the scarcity of public EV charging stations. Current methods of installing EV charging stations require time-consuming design, permitting, and installation that is unique for each charging station, driving up costs and delaying implementation schedules.

SUMMARY OF THE INVENTION

Aspects of the present invention solve the above-described problems and related problems by providing a modular support system that may be quickly and easily installed in a parking lot or other area for supporting and installing one or more electric vehicle chargers. The modular support system streamlines the deployment of electric vehicle charging stations and facilitates repeatable methods for mounting and wiring of equipment to eliminate custom design, engineering, and field-assembly. The dimensions of the components of the system promote easy transport, delivery, and installation, and standardized connection mechanisms allow the components to be quickly and easily assembled into nearly any size and pattern to accommodate a range of charging solutions from multiple vendors.

Embodiments of the modular support system include a number of substantially identical support skids. The skids have forklift channels so they can be easily handled and transported to an installation site and then quickly and easily moved into place at the site.

The modular support system also comprises quick connection mechanisms for securing the skids to the ground and interconnecting them together in nearly any number and pattern to support any number of EV chargers in nearly any arrangement. The quick connection mechanisms also allow an installed modular support system to be quickly and easily disassembled and removed and/or moved.

Each skid also has at least one wiring channel that aligns with the wiring channels of other interconnected skids so power and control cables can be easily run to and between the skids and a central cavity that opens to its wiring channel and that is accessible by a removable lid so that an installer can easily thread cables through the skid to an EV charger supported on the skid and/or to other skids. The conductors are connected to one another and the chargers through wire harnesses that enable fast and reliable connections.

The modular support system also comprises protective bollards and quick connect mechanisms for securing the bollards to the skids to protect EV chargers supported on the skids. The bollards can also be quickly and easily removed and/or moved.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF DRAWING FIGURES

Embodiments of the present invention are described below with reference to the attached drawing figures. The drawing figures do not limit the present invention to the specific embodiments disclosed and described herein. The drawings are not necessarily to scale, emphasis instead being placed upon clearly illustrating the principles of the invention.

FIG. 5 is a sectional view of the modular support system of FIG. 4 taken along line 5/5 of FIG. 4.

FIG. 6 is an exploded view of a bridge fitting clamp shown in FIG. 5.

FIG. 7 is an exploded partial sectional view showing a bollard separated from a skid.

FIG. 8 is another exploded partial sectional view showing the bollard of FIG. 7 being inserted into its skid.

FIG. 9 is another exploded partial sectional view showing the bollard of FIGS. 7 and 8 being locked to its skid.

DESCRIPTION

Figure 1:
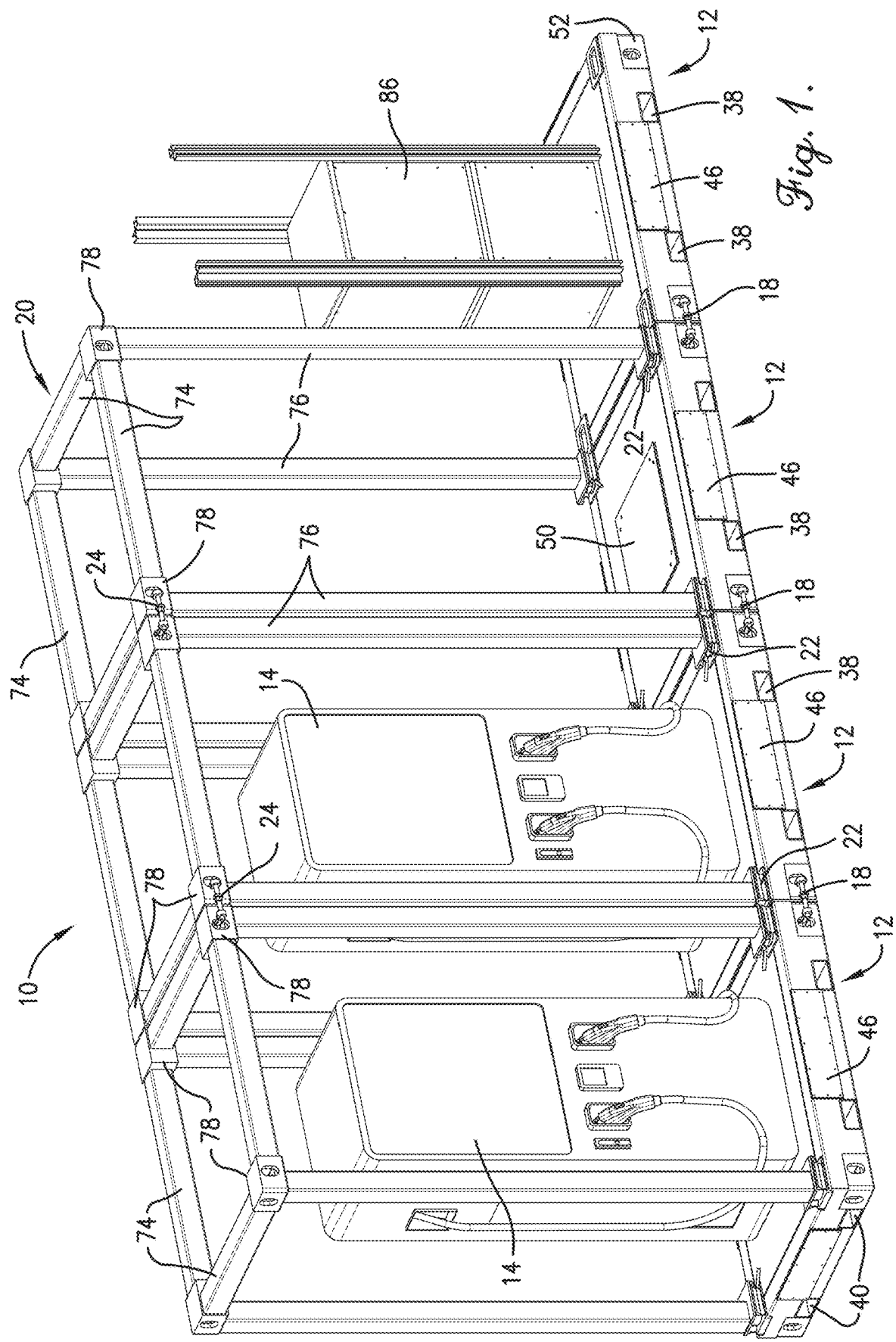
FIG. 1 is a front perspective view of a modular support system constructed in accordance with embodiments of the invention and shown with two EV chargers and a rack of electrical equipment mounted on it.
Figure 2:
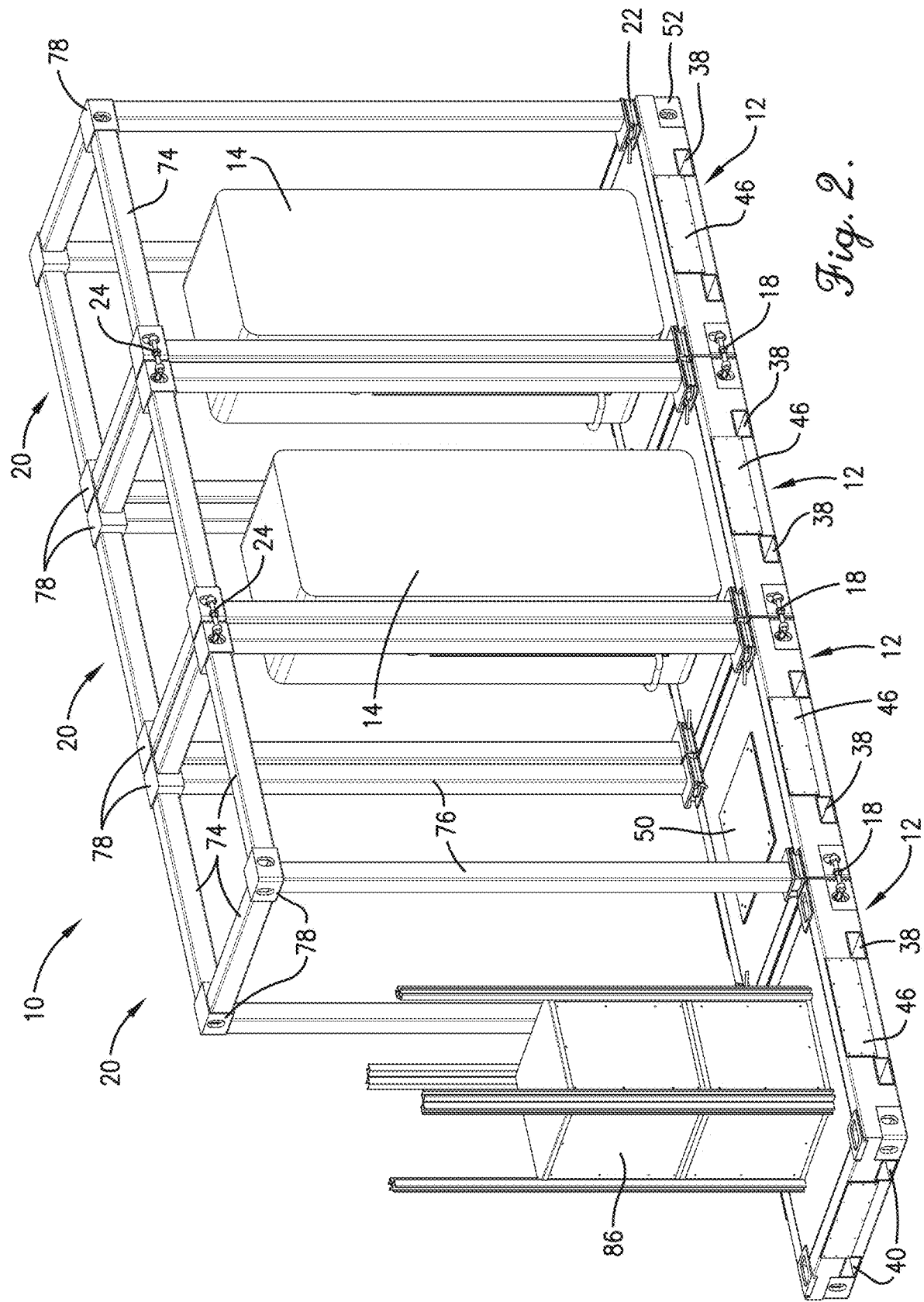
FIG. 2 is a rear perspective view of the modular support system of FIG. 1.

The present invention provides a modular support system that may be quickly and easily installed in a parking lot or other area for supporting and installing one or more electric vehicle chargers. The modular support system may be arranged and field assembled to support any number of electric vehicle chargers so as to streamline the deployment of electric vehicle charging stations to meet the growing demands of drivers and fleet-owners transitioning to clean transportation solutions. It also facilitates repeatable methods for mounting and wiring of UL-listed equipment in a standardized, controlled support system to eliminate custom design, engineering, and field-assembly, reducing design and installation costs while increasing safety and reliability. The dimensions of the individual components of the modular support system promote easy transport and delivery, and their configurations allow them to be quickly and easily assembled into a nearly endless number of sizes and patterns to accommodate a range of charging solutions from multiple vendors to meet the requirements of specific use-cases. Integration of the modular support system will enable EV charging sites to be built in a matter of days, rather than weeks, without sacrificing safety or functionality and at a lower overall cost.

Designed with consideration for storage and transportability, the modular support system comprises a number of components which are packaged together to match International Organization for Standardization (ISO) shipping container dimensions and transport methods. Once delivered to a parking lot or other EV charging station site, the components are connected together with standard twist-locks, clamps, or other quick connect mechanisms used in the shipping industry for intermodal ISO container handling. All required wiring and assembly hardware is stored on the components during shipping. Once arriving on-site, the components are unloaded by crane or forklift via integrated lifting points and slots. They are then separated and arranged in a pre-determined layout onsite, per the use-case's requirements. The components are either mounted to twist-lock connectors anchored to the ground via epoxied bolts or helical piers or are filled with a prescribed amount of ballast to meet project needs.

Specific embodiments of the modular support system 10 will now be described with reference to the attached drawing Figures. The illustrated modular support system 10 broadly comprises a plurality of skids 12 on which at least one electric vehicle charger 14 may be supported; quick connect mechanisms 16 for securing the skids to a parking lot or other ground surface; quick connect mechanisms 18 for interconnecting the skids to one another; protective bollards 20 for partially surrounding and protecting an electric vehicle charger placed on the skids; quick connect mechanisms 22 for supporting the protective bollard frame to one of the skids; and quick connect mechanisms 24 for interconnecting the bollards to one another. These and other components of the system 10 are described in more detail below.

Embodiments of the skids 12 will now be described with reference to FIGS. 10-12. The skids are preferably constructed primarily of metal or other strong, durable, weatherproof materials, are rectangular in shape, and each comprise left and right sides 26, 28, front and rear sides 30, 32, and top and bottom sides 34, 36. In one embodiment, each skid 12 is 4'-9⅜" long between its left and right sides, 3'-10½" wide between its front and rear sides, and 8" tall between its top and bottom sides. Because all the skids are substantially identical and sized as described above, they may be easily assembled to match a standard ISO 668 Series 1 freight container and transported to an installation site along with the other components of the modular support system. Other embodiments of the skid may be larger or smaller to accommodate any size of EV chargers.

Each skid 12 has at least one pair of forklift channels. One embodiment of the skid has a pair of reinforced forklift channels 38 extending between its front and rear sides and another pair of reinforced forklift channels 40 extending between its left and right sides, but other embodiments have only one pair of forklift channels. The forklift channels allow the skids to be easily placed in a shipping container, transported to an installation site, and subsequently moved into position at the installation site.

Each skid also has at least one wiring channel. One embodiment of the skid has a pair of wiring channels 42 extending between its front and rear sides and another pair of wiring channels 44 extending between its left and right sides. Other embodiments of the skid have just one wiring channel. The wiring channels allow power conductors, control wires, and other cables and wires to be quickly and easily connected to EV chargers and other components mounted on the skids. When multiple skids are interconnected as described herein, the wiring channels 42, 44 align with the wiring channels of other interconnected skids so power and control cables can be easily run to and between the skids. The wiring channels may be covered with protective covers 46 after wiring is completed.

Each skid 12 also includes a central cavity 48 that opens to its wiring channels and that is accessible by a removable lid 50 so that an installer can easily thread cables through the skid to an EV charger supported on the skid and/or to other skids.

The conductors and other wires are connected to one another and the chargers through quick connect wire harnesses that are provided with the skids. The wire harnesses allow quick and easy connection and disconnection of EV chargers and other electrical components.

Each skid also comprises corner castings 52 secured to its corners. The corner castings 52 are fabricated of metal or other high strength materials, and as best shown in FIGS. 7-9, are rectangular, hollow, and have an oval shaped opening 54 in its bottom wall and similar oval-shaped openings 56 in their exposed side walls for coupling with the quick connect mechanisms 16, 18 as described in more below. In one embodiment, the corner castings are Tandemloc 243000C series corner fittings, but they may be made by other manufacturers or made custom.

Figure 10:
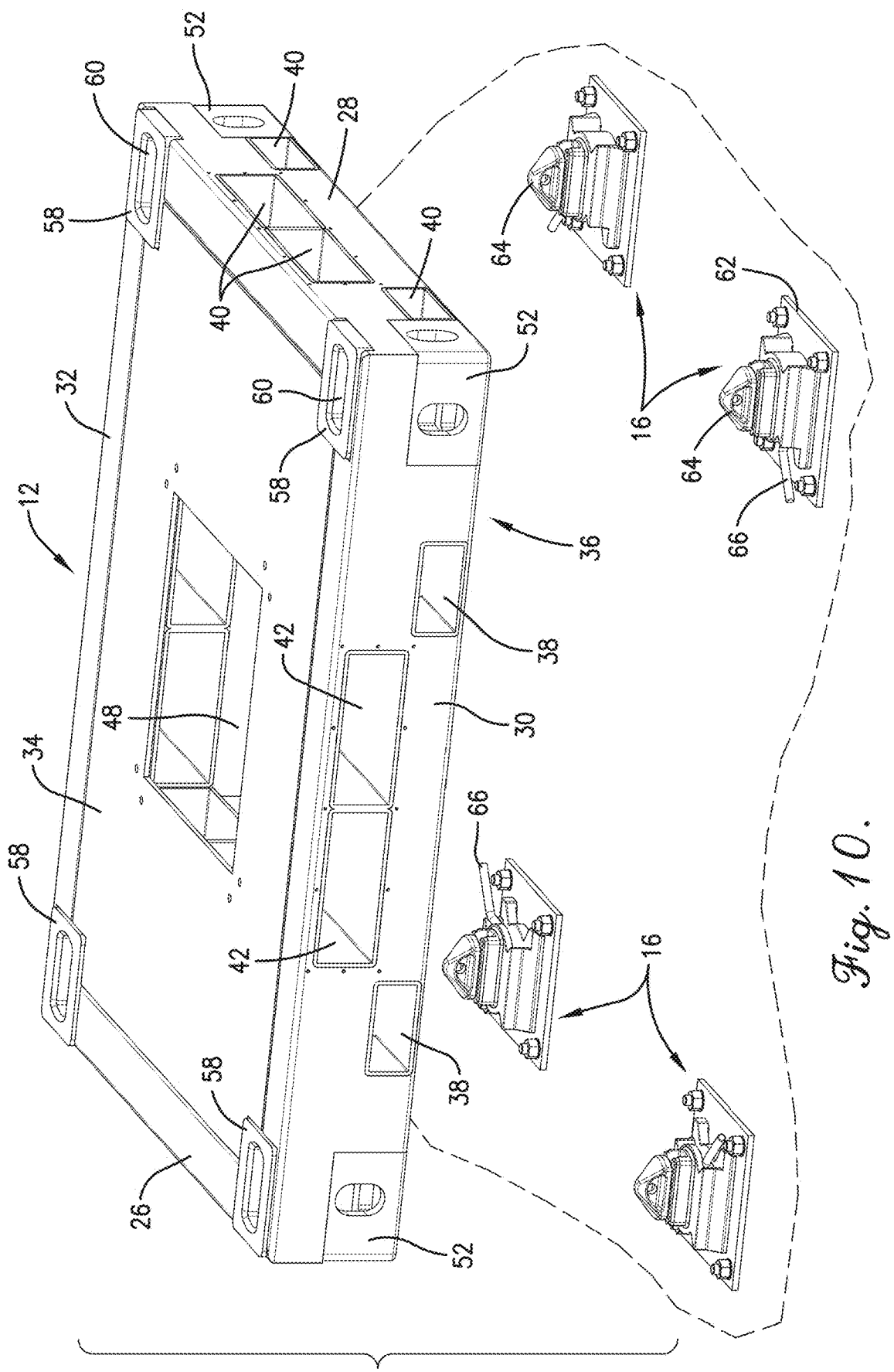
FIG. 10 is a top perspective view of a skid unattached to a number of quick connect mechanisms anchored to a parking lot or other surface.
Figure 11:
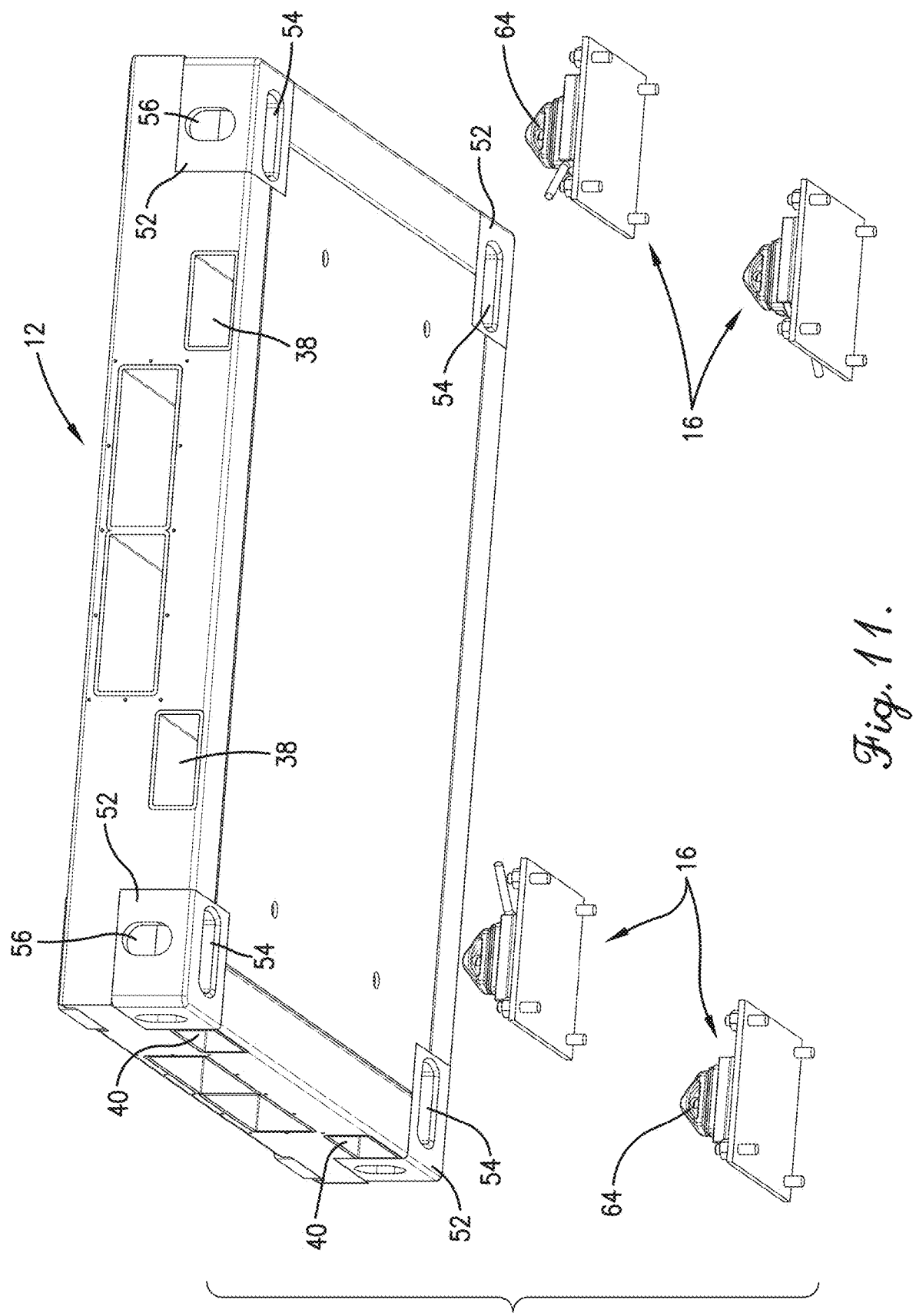
FIG. 11 is a bottom perspective view of the skid of FIG. 10 shown unattached to a number of quick connect mechanisms that are not anchored to a parking lot or other surface.
Figure 12:
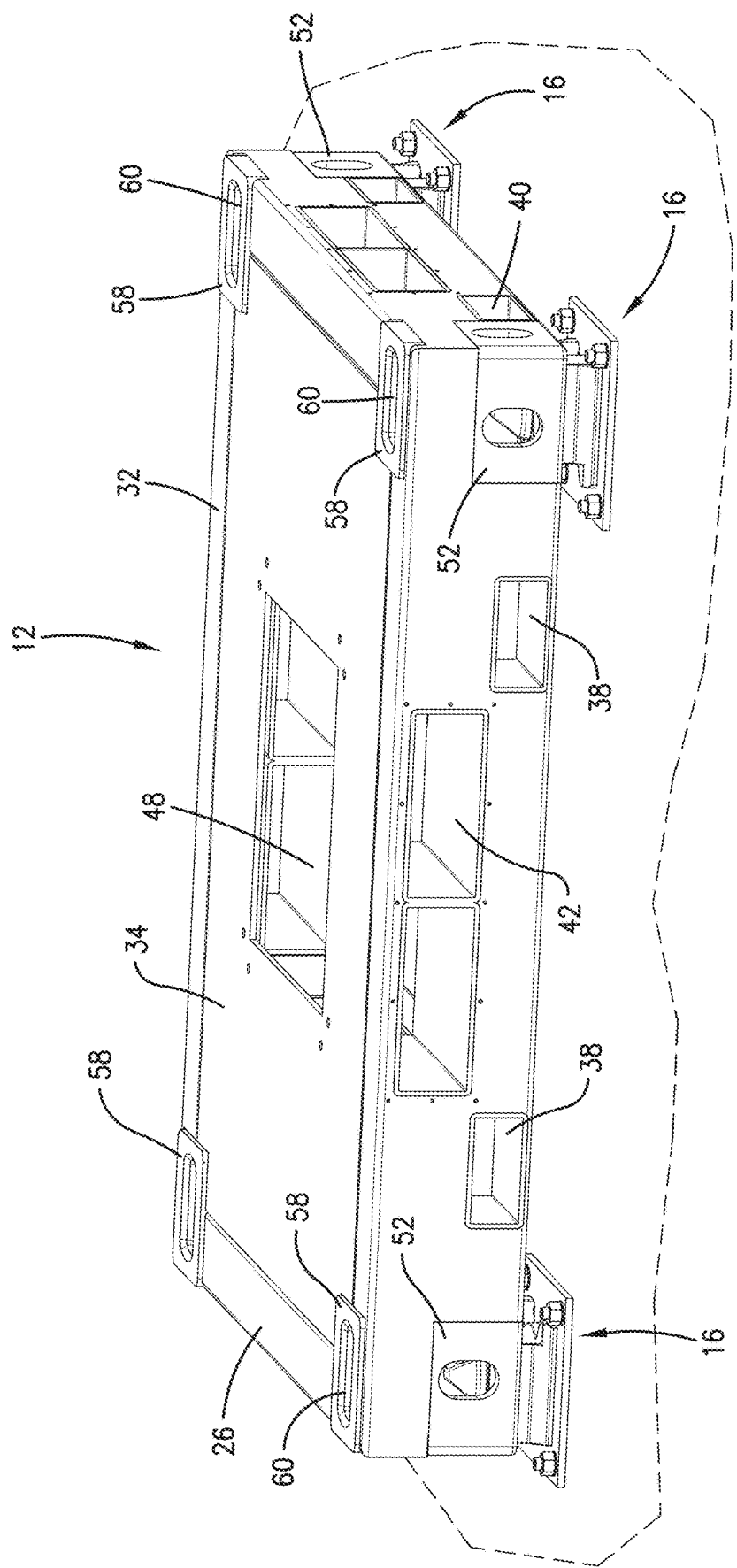
FIG. 12 is a side perspective view of the skid of FIGS. 10 and 11 shown attached and locked to a number of quick connect mechanisms that are anchored to a parking lot or other surface.

As best shown in FIGS. 10 and 11, the skids 12 also include metal connection plates 58 secured to their corners above the corner castings. Each connection plate 58 includes an oval shaped opening 60 for coupling with the quick connect mechanisms 22 for supporting the protective bollard to the skids as described in more detail below.

The quick connect mechanisms 16 will now be described primarily with reference to FIGS. 10-12. The quick connect mechanisms 16 removeably secure the skids 12 to a parking lot or other ground surface, and in one embodiment, are twistloc mechanisms such as those provided by Tandemloc, Inc. Each mechanism 16 has a base 62, a rotatable male-type connector 64, and a lever 66 or other actuator for shifting the connector 64 between locked and unlocked positions. As best shown in FIGS. 10 and 11, four of the quick connection mechanisms 16 are aligned with the corner castings 52 of one of the skids and then bolted, bonded, or otherwise attached to a ground surface. A skid 12 is then placed over the quick connect mechanisms 16 such that the male-type connectors 64 are received within the oval-shaped opening 54 in the corner casting 52. The levers 66 on the quick connect mechanisms are then operated to rotate the connectors 64 ninety degrees so as to lock the connectors in the corner castings.

The procedures described in the previous paragraph are then repeated for other skids 12. Every skid may be secured to a ground surface with the quick connect mechanisms 16 or only some of them may be. Unsecured skids are held in place by interconnecting them with, directly or indirectly, adjacent secured skids as described below.

The quick connect mechanisms 18 will now be described primarily with reference to FIGS. 3-6. The quick connect mechanisms 18 interconnect the skids to one another, and in one embodiment, are bridge fitting clamps. As best shown in FIG. 6, each mechanism 18 has a two-sided bolt 68 with reverse direction threads, a central turning head 70, and a pair of internally threaded hooks 72 on the ends of the bolt. Two skids are interconnected by placing them adjacent one another with pairs of their corner castings 52 aligned. The hooks 72 of one of the quick connect mechanisms 18 are placed in the openings 56 on adjacent corner castings, and then the bolt 68 is turned one direction via the head 70 to move the hooks 72 toward one another until the adjacent skids are firmly seated against one another. This procedure is then repeated for the corner castings on the opposing sides of the skids.

The protective bollards 20 will now be described primarily with reference to FIGS. 1-3 and 7-9. The bollards 20 partially surround and protect electric vehicle chargers 14 and other devices placed on the skids and each includes four horizontally-extending rails 74 forming a rectangular upper frame and four vertically-extending rails 76 depending from the corners of the upper frame. Corner castings 78 are integrated in the upper corners of the rails 74 for receiving the quick connect mechanisms 24 as described in more detail below.

Figure 3:
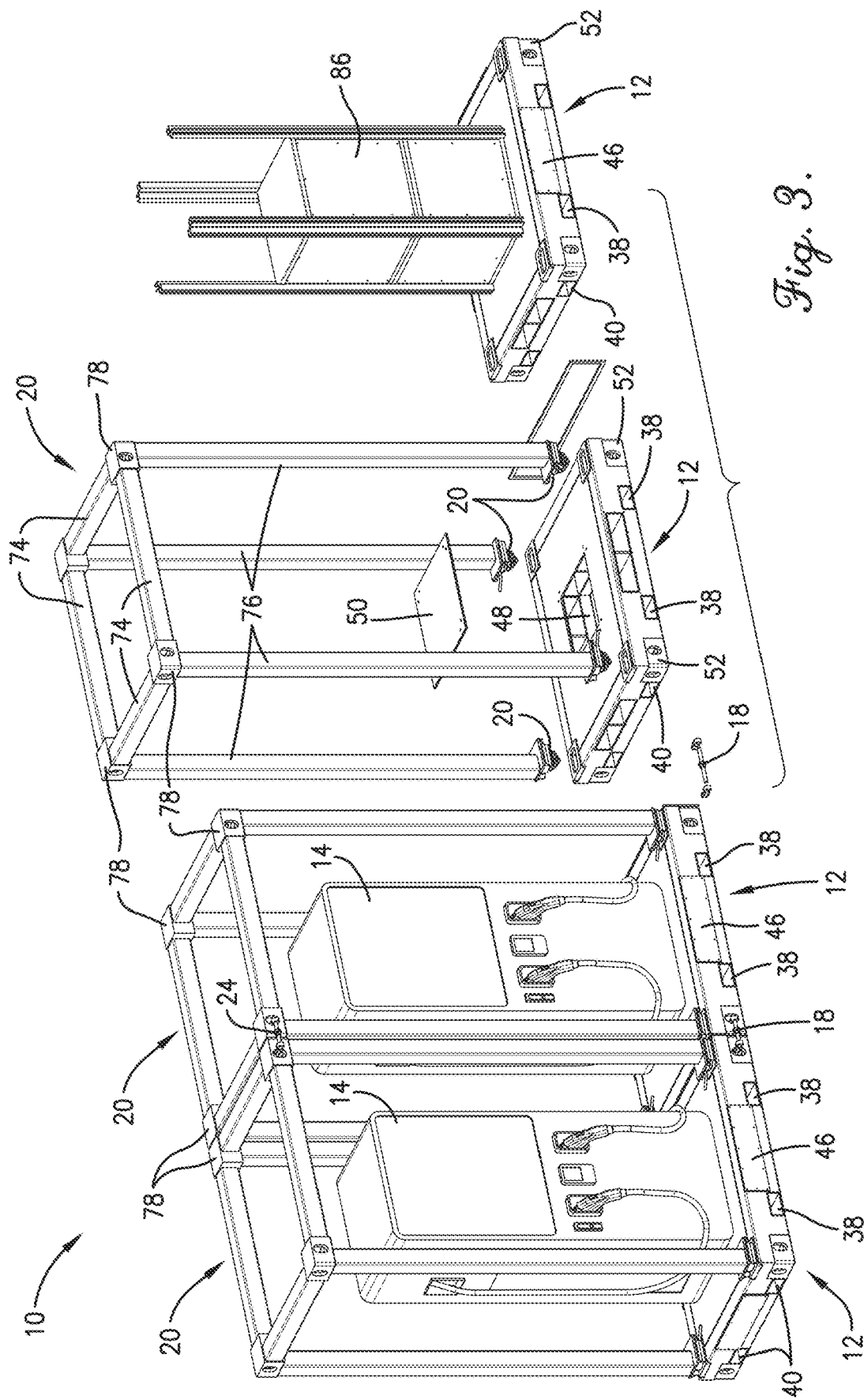
FIG. 3 is a partially exploded view of the modular support system of FIG. 1.
Figure 4:
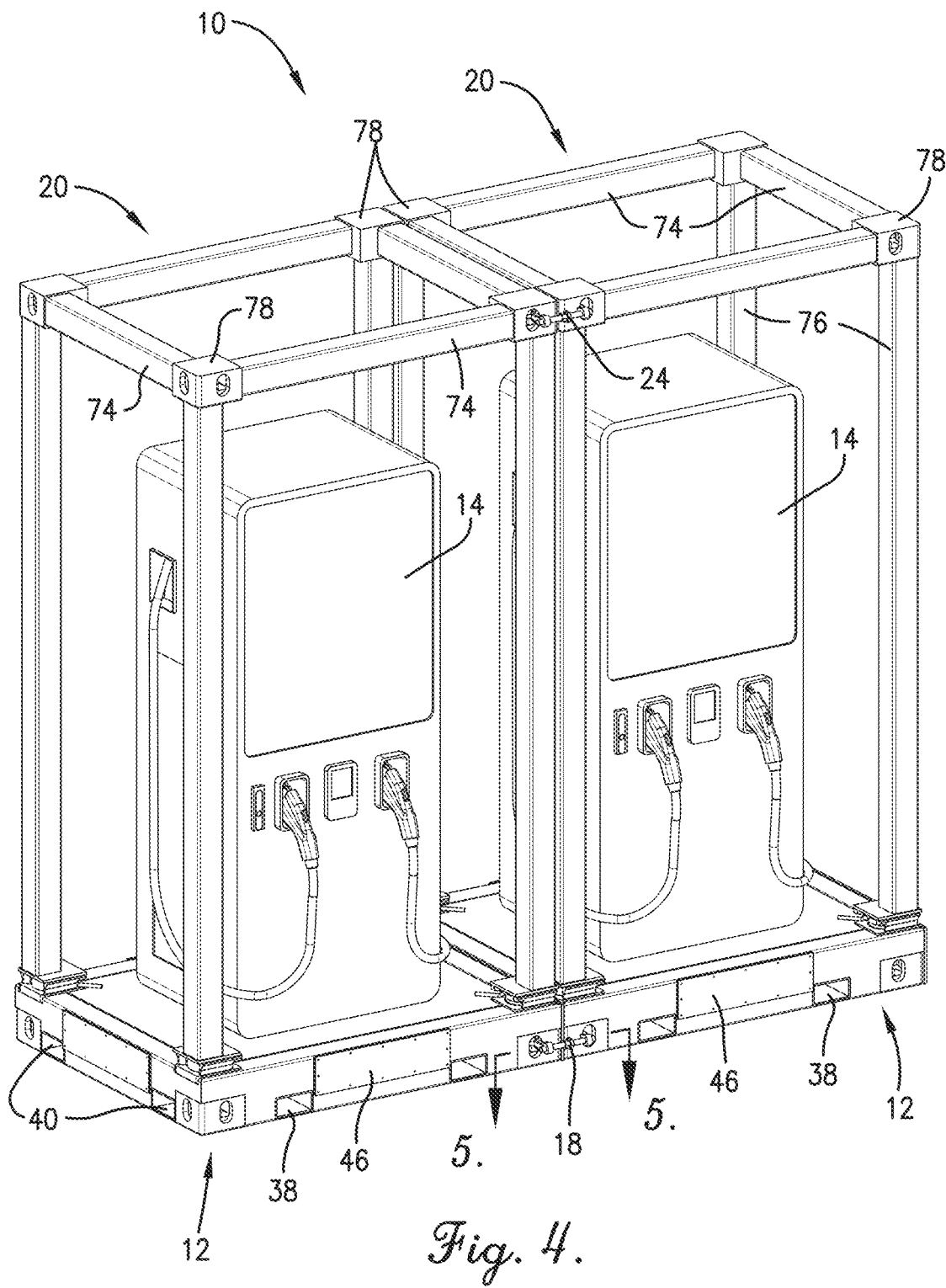
FIG. 4 is a front perspective view of a modular support system arranged and connected in a different configuration with two EV chargers mounted on it.

The bollards 20 are removably attached to the skids 12 via the quick connect mechanisms 22. As best shown in FIG. 3, four of the quick connect mechanisms 22 are welded or otherwise attached to the lower edges of the vertically-extending rails 76 of the bollards. In one embodiment, the quick connect mechanisms 22 are twistlocs manufactured by Tandemloc, Inc. and each has a base 80, a rotatable male-type connector 82, and a lever 84 or other actuator for shifting the connector 64 between locked and unlocked positions.

A bollard is secured to a skid by inserting the connectors 82 in the oval-shaped holes 60 in the metal plates 58 and then turning the levers 84 to rotate the connectors 82 ninety degrees so as to lock the connectors in the metal plates. Quick connection mechanisms 24 may then be secured to the corner castings 78 of adjacent bollards to interconnect the bollards. The quick connect mechanisms 24 are preferably the same as the mechanisms 18 and are secured in the same way as described above.

After the skids 12 are placed as described above, one or more EV chargers 14 may be placed on the skids and prefabricated wiring harnesses attached to the EV chargers and run through the wiring channels and internal cavities. Ballast blocks may be placed in the internal cavities of skids on which no EV chargers are placed to better anchor the skids to the ground. Other electrical equipment 86 such as control panels, transformers, etc. may be supported on some of the skids.

The modular support system may comprise other useful features. For example, the upper surfaces of the skids may be textured to allow safe walking on them, and overhead lighting may be integrated in the bollards. Although the modular support system is particularly useful for supporting EV chargers, it may also be used to support other components such as HVAC units, transformers, motors, pumps, controllers, and lights.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of any related issued patents and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims in any related issued patents are not intended to be construed under 35 U.S.C. § 112(f) unless traditional means-plus-function language is expressly recited, such as "means for" or "step for" language being explicitly recited in the claim(s).

Having thus described various embodiments of the invention, what is claimed as new and desired to be protected by Letters Patent includes the following:

1. A modular support system comprising:
   a plurality of skids on which at least one component may be supported;
   quick connect mechanisms for securing the skids to a ground surface;
   quick connect mechanisms for interconnecting the skids to one another;
   a protective bollard frame for partially surrounding and protecting the component supported on the skids; and
   quick connect mechanisms for supporting the protective bollard frame to one of the skids, wherein each of the skids comprises:
   left and right sides, front and rear sides, top and bottom sides, and four corners;
   a corner casting secured to each corner;
   a connection plate secured to each corner, each connection plate positioned above one of the corner castings;
   at least one forklift channel between the front and rear sides;

at least one wiring channel between the left and right sides; and a central cavity in the top side.

2. The modular support system of claim 1, wherein the quick connect mechanisms for securing the skids to the ground surface comprise clamps that are secured to the ground surface and that engage and lock with the corner castings of the skids.

3. The modular support system of claim 1, wherein the quick connect mechanisms for interconnecting the skids to one another comprise bridge fittings that engage the corner castings of the skids.

4. The modular support system of claim 1, wherein the quick connect mechanisms for supporting the protective bollard frame to one of the skids comprise clamps that are secured to the protective bollard frame and that engage and lock with the connection plates of the skids.

5. The modular support system of claim 1, wherein each of the skids further comprises a removable cover plate for covering the central cavity in the top side.

6. The modular support system of claim 1, wherein the skids, when interconnected, have outer dimensions that align with ISO 668 series 1 freight containers.

7. A modular support system for electric vehicle chargers, the modular support system comprising:
a plurality of skids on which electric vehicle chargers may be supported, wherein each of the skids comprises:
a rectangular-shaped frame having left and right sides, front and rear sides, top and bottom sides, and four corners;
a corner casting secured to each corner of the frame;
a connection plate secured to each corner of the frame, each connection plate positioned above one of the corner castings;
at least one pair of forklift channels extending through the frame;
at least one wiring channel extending through the frame; and
a central cavity in the top side of the frame;
quick connect mechanisms for securing the skids to a ground surface;
quick connect mechanisms for interconnecting the skids to one another;
protective bollards for partially surrounding and protecting the electric vehicle chargers;
quick connect mechanisms for supporting the protective bollards to the skids; and
quick connect mechanisms for interconnecting the protective bollards to one another.

8. The modular support system of claim 7, wherein the ground surface is a parking lot.

9. The modular support system of claim 7, wherein the quick connect mechanisms for securing the skids to a ground surface comprise twistlock clamps that are secured to the ground surface and that engage and lock with the corner castings of the skids.

10. The modular support system of claim 7, wherein the quick connect mechanisms for interconnecting the skids to one another comprise bridge fittings that engage the corner castings of the skids.

11. The modular support system of claim 7, wherein the quick connect mechanisms for supporting the protective bollards to one of the skids comprise twistlock clamps that are secured to the protective bollards and that engage and lock with the connection plates of the skids.

12. A modular support system for electric vehicle chargers, the modular support system comprising:
a plurality of skids that may be arranged in any pattern on a ground surface and
which are configured to support electric vehicle chargers, wherein each of the plurality of skids comprises:
a rectangular-shaped frame having left and right sides, front and rear sides, top and bottom sides, and four corners, and
a corner casting secured to each corner of the frame;
quick connect mechanisms for removably securing the skids to the ground surface;
quick connect mechanisms for interconnecting the skids to one another;
protective bollards for partially surrounding and protecting the electric vehicle chargers;
quick connect mechanisms for removably supporting the protective bollards to the skids; and
quick connect mechanisms for interconnecting the protective bollards to one another,
wherein the quick connect mechanisms for securing the skids to a ground surface comprise twistlock clamps that are secured to the ground surface and that engage and lock with the corner castings of the skids.

13. The modular support system of claim 12, wherein each of the skids comprises: a connection plate secured to each corner of the frame, each connection plate positioned above one of the corner castings; at least one pair of forklift channels extending between the front and rear sides of the frame; at least one wiring channel extending through left and right sides of the frame; and a central cavity in the top side of the frame.

14. The modular support system of claim 13, wherein the quick connect mechanisms for supporting the protective bollards to one of the skids comprise twistlock clamps that are secured to the protective bollards and that engage and lock with the connection plates of the skids.

15. The modular support system of claim 12, wherein the ground surface is a parking lot.

16. The modular support system of claim 12, wherein the quick connect mechanisms for interconnecting the skids to one another comprise bridge fittings that engage the corner castings of the skids.

17. The modular support system of claim 12, wherein the skids are identical.

18. The modular support system of claim 17, wherein the skids are rectangular and stackable.

\* \* \* \* \*